July 22, 1952  A. JENSEN  2,603,859
BEER CAN OPENER
Filed Jan. 25, 1949  2 SHEETS—SHEET 1

INVENTOR.
Arthur Jensen
BY Victor J. Evans & Co.
ATTORNEYS

July 22, 1952  A. JENSEN  2,603,859
BEER CAN OPENER
Filed Jan. 25, 1949  2 SHEETS—SHEET 2
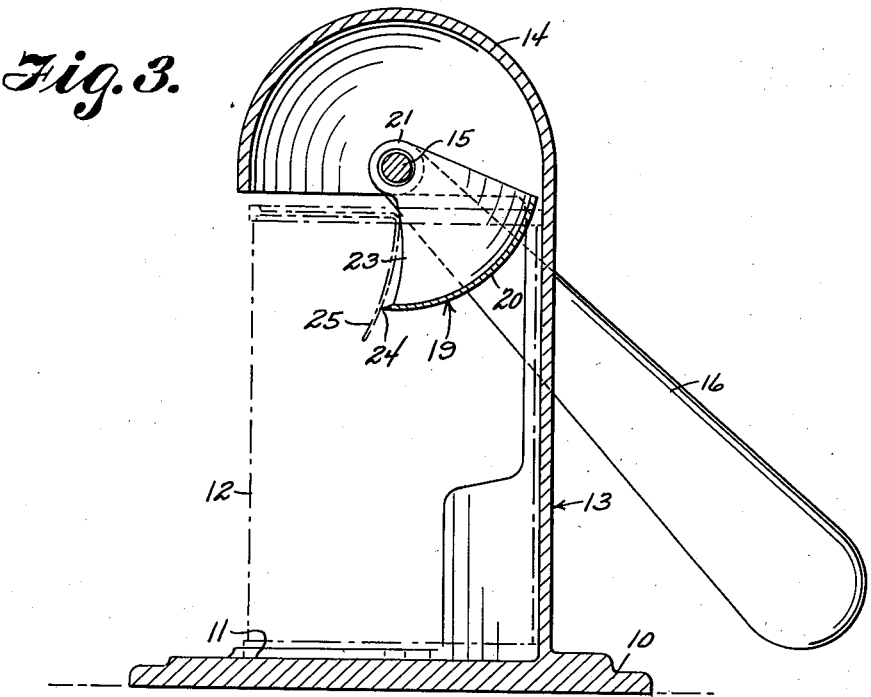
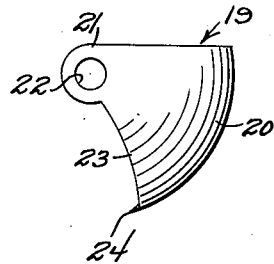
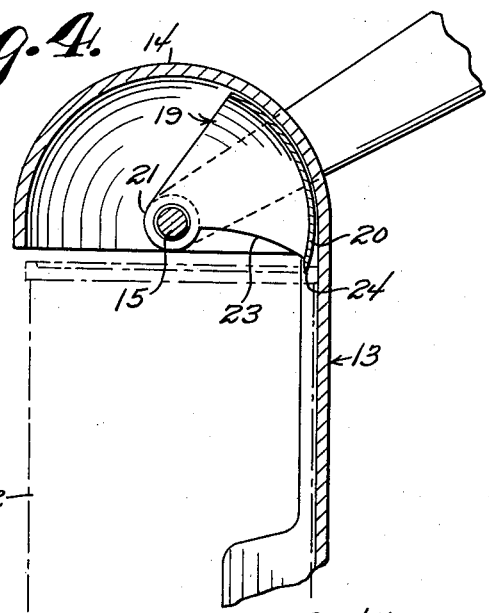
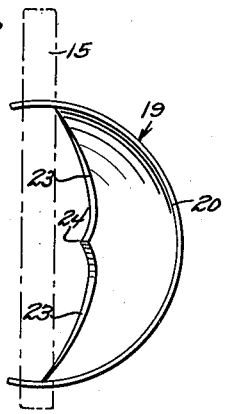
INVENTOR
Arthur Jensen
BY Victor J. Evans & Co.
ATTORNEYS Patented July 22, 1952

2,603,859

UNITED STATES PATENT OFFICE 2,603,859

BEER CAN OPENER

Arthur Jensen, Minot, N. Dak.

Application January 25, 1949, Serial No. 72,565

1 Claim. (Cl. 30—10)

This invention relates to can openers, and more particularly to a device for opening cans containing beer and the like.

The object of the invention is to provide a device which will open beer cans so that a person can conveniently drink the beer or beverage, from the can.

Another object of the invention is to provide a device for easily and quickly opening beer cans, and which will ensure that there are no dangerous burrs projecting from the can, whereby the user can safely drink the beer from the can.

A further object of the invention is to provide a can opener which is extremely simple and inexpensive to manufacture.

Other objects and advantages will be apparent during the course of the following description.

In the accompanying drawings forming a part of this application, and in which like numerals are employed to designate like parts throughout the same:

Figure 3 is a sectional view taken on the line 3—3 of Figure 1, and illustrating in broken lines the beer can;

Figure 4 is a fragmentary sectional view similar to Figure 3, but showing the position of the cutter at the beginning of the cutting operation;

Figure 5 is a side elevational view of the cutter;

Figure 6 is a plan view of the cutter.

Figure 1:
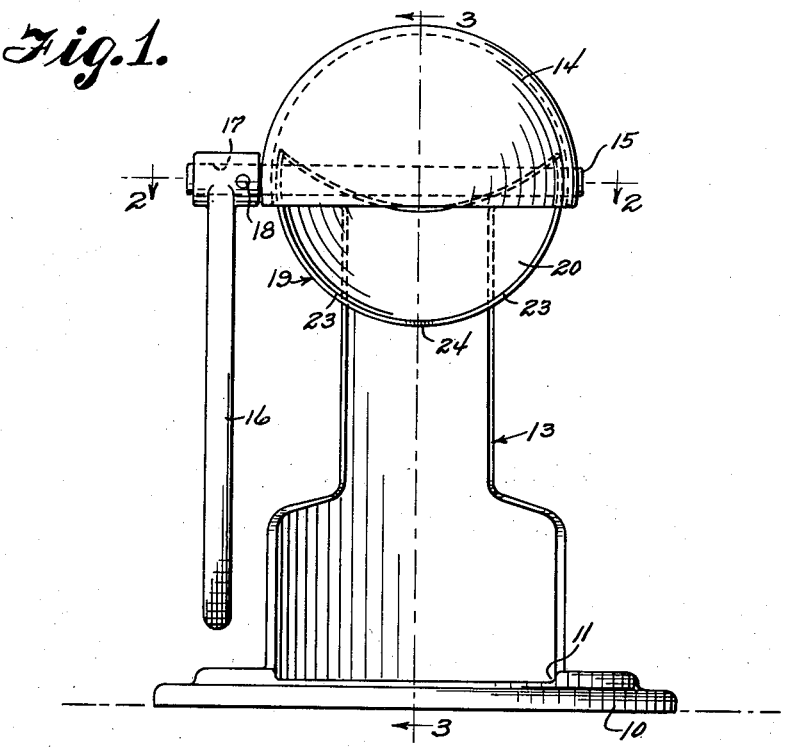
Figure 1 is an end elevational view of the can opener, according to the present invention.

Referring in detail to the drawings, the numeral 10 designates a horizontally-disposed base which has its central portion cut away, as at 11, to define a seat for receiving therein a can of beer 12, or the like, which is to be opened. Projecting upwardly from the base 10 is a vertically-disposed standard or brace 13 which may be curved to conform to the contour of the can to be opened. A semi-cylindrical shield or cover 14 is arranged in spaced relation above the base 10 and the shield 14 is secured to or formed integrally with the top of the standard 13.

Figure 2:
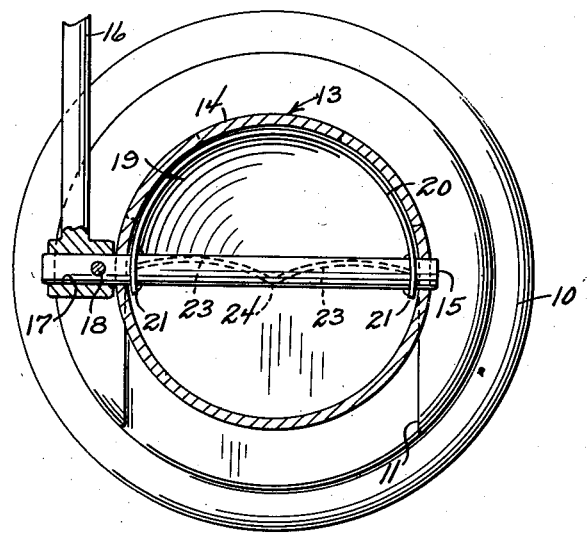
Figure 2 is a sectional view taken on the line 2—2 of Figure 1.

A horizontally-disposed shaft 15 is rotatably supported by the shield 14, and for causing rotary movement of the shaft 15, a handle 16 is provided. The handle 16 has a socket 17, Figure 2, formed in one end for receiving therein a portion of the shaft 15, and a rivet 18, Figure 2, secures the handle 16 to the shaft 15.

A cutter 19 is secured to the rotatable shaft 15, and this cutter comprises an arcuately-shaped plate 20 provided with a pair of opposed ears 21. The ears 21 each has an aperture 22 through which projects the shaft 15. The plate 20 has a sharp beveled cutting edge 23, and this cutting edge is so shaped or cut away as to define an intermediate projecting cutting tip 24.

In use, the can of beer to be opened is supported on the base 10 and the handle 16 and cutter 19 positioned as shown in Figure 4. Then the handle 16 is moved downwardly whereby the cutting tip 24 will penetrate the top of the beer can 12, and upon further downwardly movement of the handle 16, the beveled cutting edge 23 will make a wide cut in the top of the can. Thus, a portion 25 of the can top will be bent back, as shown in Figure 3, so that the beer, or other beverage, can be conveniently drunk from the can. As the cutter 19 moves down into the can, the arcuate plate will bend back any dangerous burrs which project from the edge of the can.

As many embodiments may be made of this inventive concept, and as many modifications may be made in the embodiment hereinbefore shown and described, it is to be understood that all matter herein is to be interpreted merely as illustrative and not in a limiting sense.

I claim:

In a can opener, a horizontally disposed base having its central portion cut away to define a seat for receiving therein a can, a vertically disposed curved standard projecting upwardly from said base, a semicylindrical shield arranged in spaced relation above said base and secured to the upper end of said standard, a horizontally disposed shaft rotatably supported by said shield, a handle provided with a socket on one end thereof for receiving therein an end of said shaft, a securing element for maintaining said shaft and handle connected together, an arcuately-shaped plate provided with a pair of opposed ears, each of said ears being provided with an aperture for the projection therethrough of said shaft, said plate having a sharp cutting edge, said cutting edge being shaped to define a centrally located cutting tip, said tip extending below the longitudinal center of the handle so that as the handle is pressed downward said tip will enter and puncture the can.

ARTHUR JENSEN.

REFERENCES CITED

The following references are of record in the file of this patent:

UNITED STATES PATENTS

| Number | Name | Date |
|---|---|---|
| 1,996,550 | Sampson et al. | Apr. 2, 1935 |
| 2,284,066 | Ostrander | May 26, 1942 |